United States Patent [19]

Eng et al.

[11] Patent Number: 5,101,290
[45] Date of Patent: Mar. 31, 1992

[54] HIGH-PERFORMANCE PACKET-SWITCHED WDM RING NETWORKS WITH TUNABLE LASERS

[75] Inventors: Kai Y. Eng, Eatontown; Mark J. Karol, Fair Haven, both of N.J.

[73] Assignee: AT&T Bell Laboratories, Murray Hill, N.J.

[21] Appl. No.: 561,852

[22] Filed: Aug. 2, 1990

[51] Int. Cl.$^5$ ............................................... H04J 2/00
[52] U.S. Cl. ..................................... 359/123; 370/50; 370/73
[58] Field of Search .................... 370/50, 69.1, 124, 3, 370/4, 1, 71–73

[56] References Cited

U.S. PATENT DOCUMENTS

| | | | |
|---|---|---|---|
| 3,483,329 | 12/1969 | Hunkins | 370/85.15 |
| 4,675,866 | 6/1987 | Takumi et al. | 370/124 |
| 4,759,011 | 7/1988 | Hicks, Jr. | 370/3 |
| 4,955,021 | 9/1990 | Wei | 370/124 |

OTHER PUBLICATIONS

"Terabit Lightwave Networks: The Multihop Approach", by A. S. Acampora et al., AT&T Technical Journal, Nov./Dec., 1987, vol. 66, Issue 6.

Primary Examiner—Curtis Kuntz
Assistant Examiner—L. Pascal
Attorney, Agent, or Firm—T. Stafford

[57] ABSTRACT

A communications network comprising a plurality of "subnetworks" multiplexed onto a single communications medium. A separate group of NIU's communicate on each predetermined "subnetwork", and each NIU also includes a tunable transmitter for transmitting data to NIU's of other subnetworks. Data from a user equipment is transmitted via the tunable transmitter if it is destined for an NIU from another subnetwork, and via a fixed transmitter if it is destined for an NIU on the same subnetwork. In one embodiment, fiber optics is utilized in order to provide a high speed network with tunable lasers.

5 Claims, 2 Drawing Sheets

HIGH-PERFORMANCE PACKET-SWITCHED WDM RING NETWORKS WITH TUNABLE LASERS

TECHNICAL FIELD

This invention relates to communications networks and more particularly, to a Network Interface Unit (NIU) for constructing a tunable laser, multihop communications network.

DESCRIPTION OF THE PRIOR ART

Recently, multihop lightwave networks have been proposed in an effort to fully utilize the large bandwidth of optical transmission media. One such proposal is described in the article "Terabit Lightwave Networks: The Multihop Approach" by Acampora et al. in *AT&T Technical Journal*, Vol. 66, Issue 6, November 1987. In the Acampora system, each NIU employs one or more optical transmitters and receivers of fixed wavelength, where the transmit and receive frequencies for the NIU's may be the same or different for different NIU's. Data is transmitted among the NIU's by "hopping" data packets through one or more intermediate NIU's until the packets reach an NIU which is arranged to transmit on the receive frequency of the destination NIU for the packets. The data packets are then transmitted to the destination NIU. This system avoids the need to constantly retune optical receivers or transmitters, a process which would waste considerable bandwidth.

One drawback of the Acampora system may be appreciated by considering the transmission of a large data file which comprises a large number of packets. All of the NIU's through which the data packets are 'hopped' are unnecessarily burdened with excess traffic. Thus, the need has arisen to design a network which can utilize the large bandwidth of the optical medium, yet avoid some of the drawbacks of multihop systems.

One system which has been proposed is described in copending U.S. patent application Ser. No. 374,895, by inventor L-F. Wei now U.S. Pat. No. 4,955,021 issued on Sept. 4, 1990 and assigned to the same assignee as this application. In the Wei system, both multihop techniques and retunable optical receivers are utilized. The Wei system, however, is slightly more complex and architecturally dependent than is desirable.

The problem remaining in the prior art is to provide a flexible and simple network architecture which may utilize the advantages of multihop networks, yet operate somewhat more efficiently.

SUMMARY OF THE INVENTION

These and other problems are overcome in accordance with the present invention which relates to an improved NIU and network for providing communications among user equipments. In accordance with the invention, several subnetworks are multiplexed onto a common medium. Data is transmitted among NIU's on the same subnetwork via direct transmission. An NIU may transmit to NIU's on other subnetworks by monitoring such other subnetworks for activity, and then temporarily retuning its tunable transmitter to transmit on that other subnetwork when the subnetwork is idle.

In one embodiment, optical fiber is employed as the communications medium, and passive optical taps are utilized at each NIU. This embodiment has the further advantage that the passive taps attenuate the optical signal and thus allow reuse of the same wavelength in various nonoverlapping portions of the communications medium.

DETAILED DESCRIPTION

Figure 1:
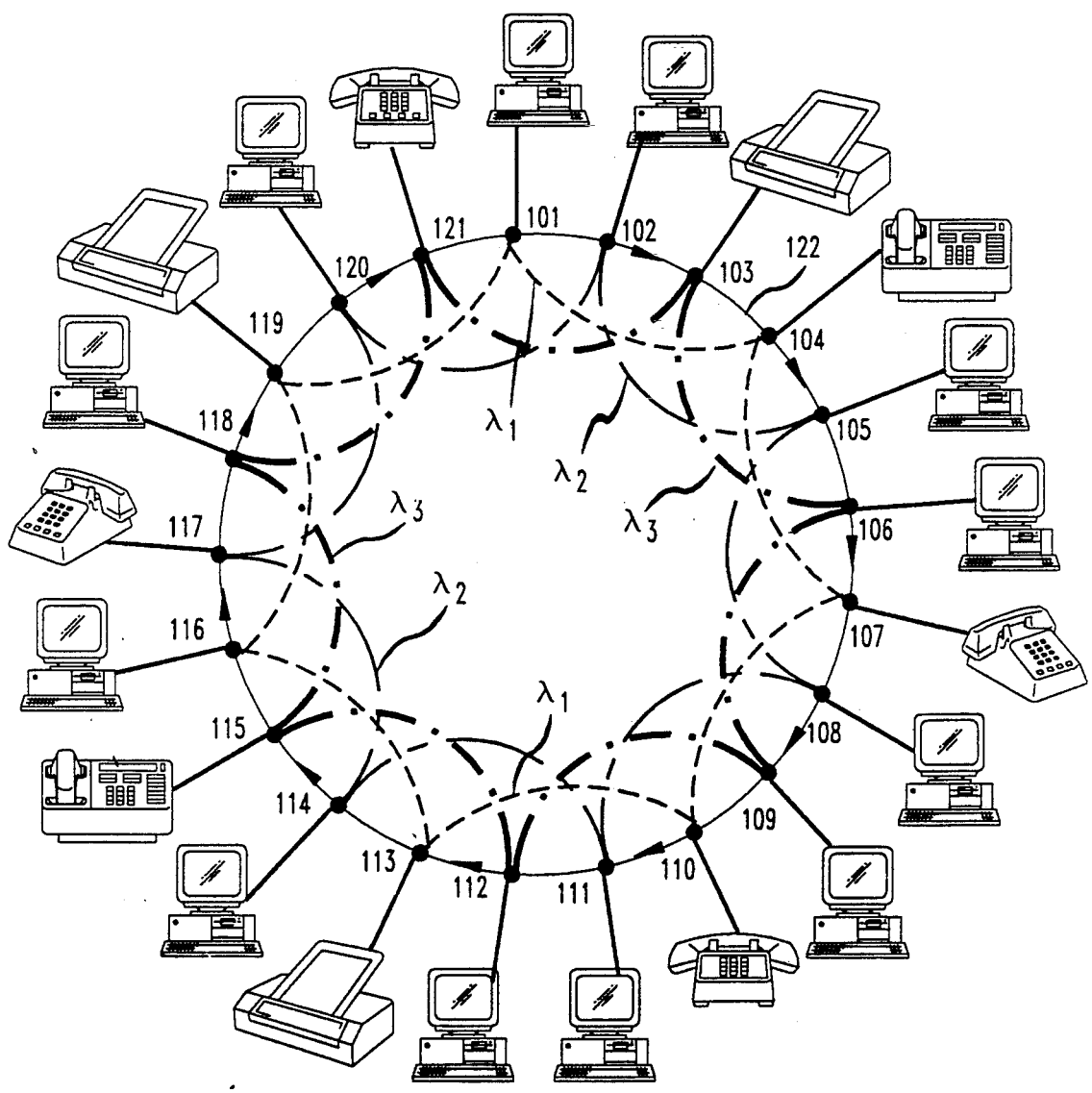
FIG. 1 shows a logical diagram of an exemplary network in accordance with the invention.

FIG. 1 shows a logical block diagram of a Local Area Network (LAN) in accordance with the invention. The arrangement shown in FIG. 1 comprises communications medium 122 and NIU's 101–121. Each NIU may be used to interface one or more user equipments to communications medium 122 in accordance with techniques which are well known in the art. It is to be understood that although the arrangement of FIG. 1 is shown as a ring architecture, the NIU's may be connected in other topologies also, such as a bus for example.

Communications medium 122 includes three exemplary channels, each of which is implemented on a separate wavelength. Specifically, NIU's 101–103 each include a fixed transmitter and receiver tuned to $\lambda 1$, $\lambda 2$, and $\lambda 3$, respectively. Each of NIU's 104 through 121 includes a fixed transmitter and receiver tuned to the same wavelength as the NIU located three before it on communications medium 122. Thus, NIU's 101, 104, 107, 110, 113, 116 and 119 each contain a fixed receiver and transmitter tuned to $\lambda 1$, while NIU's 102, 105, 108, 111, 114, 117, and 120 each contain a fixed transmitter and receiver tuned to $\lambda 2$. These connections are indicated via dashed lines in FIG. 1. Further, the remaining NIU's are connected via fixed transmitters and receivers tuned to $\lambda 3$. Thus, the network of FIG. 1 can be thought of as three subnetworks, each implemented on a different wavelength, and each connecting a different set of every third NIU.

Although each of the subnetworks of FIG. 1 is implemented on one wavelength, in practical systems, each of the subnetworks may be implemented on several wavelengths. For example, NIU 116 of FIG. 1 includes a fixed receiver arranged to receive on $\lambda 1$ and a fixed transmitter tuned to $\lambda 1$. The fixed transmitter, however, could be tuned to some other wavelength, such as $\lambda 4$. This would require, however, that the fixed receiver at NIU 119 be tuned to $\lambda 4$. In general, as long as overlapping portions of the different subnetworks do not use the same wavelength, each subnetwork can operate substantially independently. For purposes of explanation herein, however, it is assumed that each subnetwork is implemented on one single wavelength.

Another property of the arrangement of FIG. 1 is that the number of NIU's disposed between any two NIU's on the same subnetwork is such that a signal travelling along communications medium 122 will be attenuated beyond recognition after being received by the next NIU on the subnetwork. This property has been utilized advantageously to allow wavelength reuse. See for example, copending U.S. patent application Ser. No. 463,581, filed Jan. 11, 1990 assigned to the same assignee as this application. By way of example, NIU 104 of FIG. 1 transmits on wavelength $\lambda 1$ to NIU 107. Each of the NIU's 105, 106, and 107, connected to communications medium 122 via passive couplers for example, would attenuate the signal transmitted from NIU 104 to 107 so that after the signal transmitted from NIU 104 is received by NIU 107, no other NIU's can receive it; i.e. as the signal continues to propagate and thus reaches NIU 108, it is attenuated beyond recognition.

One other property of the network of FIG. 1 is that each NIU includes a tunable activity detector for monitoring activity on subnetworks other than its own associated subnetwork, and a tunable transmitter for transmitting on these other subnetworks when they are detected to be idle. For example, when NIU 101 transmits on $\lambda 1$ to NIU 104, NIU 102 can monitor such transmissions to detect idle time slots on the subnetwork connecting NIU's 101 and 104. Further, NIU 102 can retune its tunable transmitter to transmit on $\lambda 1$. This property allows transmission between any two NIU's as described below.

Turning now to the operation of the network, communications among NIU's on the same subnetwork is accomplished by transmitting packets, in sequence and clockwise, from one NIU to the next NIU on the same subnetwork during predetermined time slots. For example, a packet to be transmitted from NIU 107 to NIU 119, is transmitted first to NIU 110, where it is received and reamplified. This reamplification is necessary because, as previously explained, the transmitted packet would be attenuated beyond recognition after it passes NIU 110. From NIU 110, the packet is transmitted to NIU 113, and then, to NIU 116. In turn, the packet is finally transmitted to NIU 119 for final processing by an associated equipment. Transmissions among NIU's 107, 110, 113, 116 and 119 is accomplished on wavelength $\lambda 1$, as shown in FIG. 1.

Communications among NIU's not connected to the same subnetwork is accomplished by the transmitting NIU monitoring the receiving NIU's subnetwork, and "changing over" to that subnetwork when it is idle. For example, consider the case where NIU 106 is to transmit data to NIU 113. Note from FIG. 1 that NIU 113, the receiving NIU for the data, is arranged to receive data on $\lambda 1$. NIU 106 therefore, would tune its tunable activity detector to $\lambda 1$, and would monitor transmissions from NIU 104 to NIU 107. Note that actual processing of these communications is unnecessary; the activity detector need only identify the absence or presence of a signal. A more detailed description of the NIU hardware is described hereinafter.

When NIU 106 detects an idle time slot on the subnetwork connecting NIU's 104 and 107, the packet from NIU 106 will be output onto communications medium 122 using wavelength $\lambda 1$. Because of the wavelength being used, the packet will be received by the fixed frequency receiver associated with NIU 107. It will then be conveyed from NIU 107 to NIU 113 via NIU 110, as previously described. In this manner, an NIU can communicate to other NIU's on its own subnetwork via its associated fixed wavelength, and to NIU's on other subnetworks via a tunable transmitter.

Figure 2:
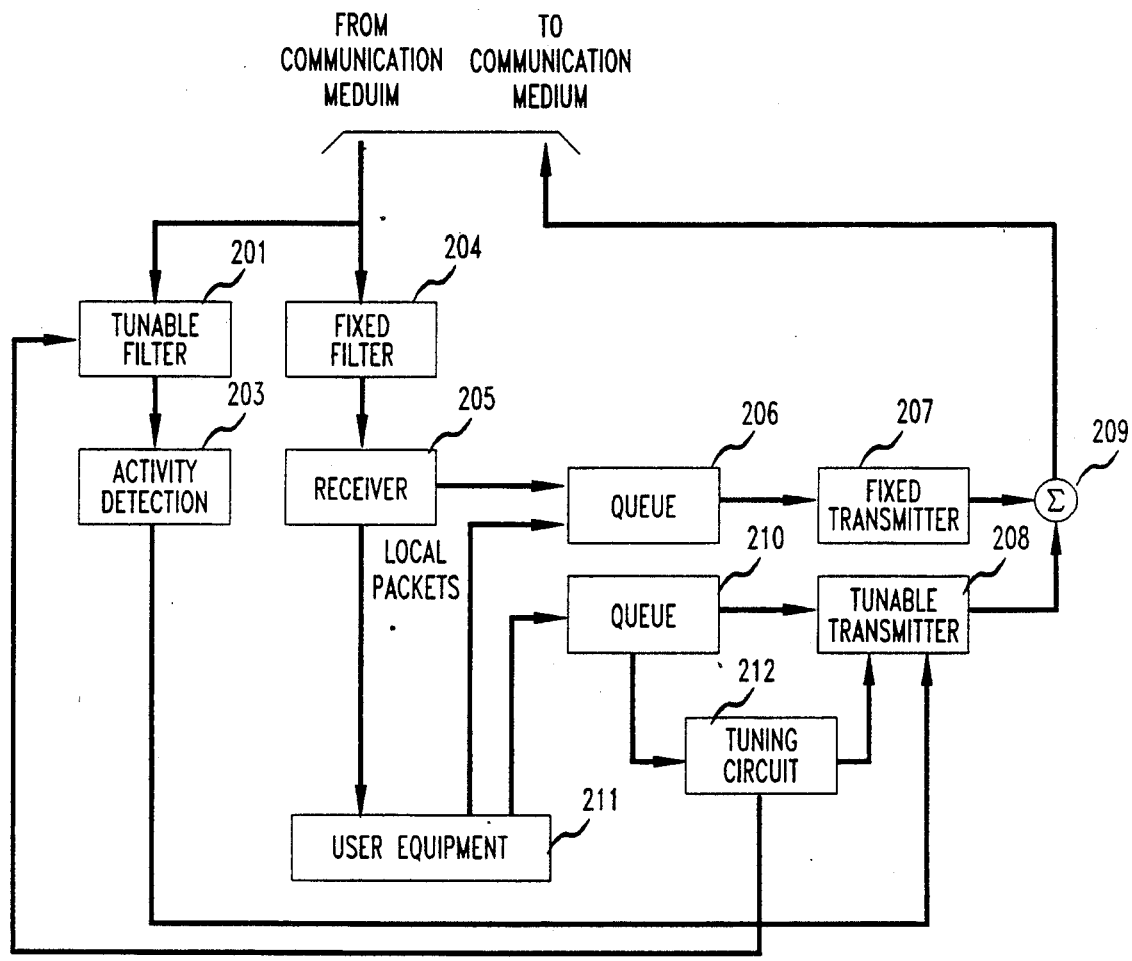
FIG. 2 is a high level block diagram of a Network Interface Unit (NIU) which may be used in the arrangement of FIG. 1.

Having described the basic operation of the network, we turn now to FIG. 2, a block diagram of an exemplary NIU which may be used in the inventive network. User equipment 211 may be any of a variety of well known devices, as the particulars of such user equipment are unimportant to the invention.

Operation of the NIU is first described with reference to its own associated subnetwork. Assume, for purposes of explanation only, that the NIU shown in FIG. 2 represents NIU 105 of FIG. 1. As can be seen from FIG. 1, NIU 105 is arranged to use the $\lambda 2$ subnetwork. Accordingly, fixed transmitter 207 is arranged to transmit on $\lambda 2$.

Packets to be relayed by NIU 105, i.e. packets which must be transmitted on subnetwork $\lambda 2$ from NIU 102 to NIU 108, arrive at fixed filter 204. Fixed filter 204 removes energy at $\lambda 1$ and $\lambda 3$ and supplies the desired signal i.e.; the data from $\lambda 2$ to receiver 205. Receiver 205 completes reception of the packet by performing demodulation, and reading the address. Packets destined for NIU 105 are removed from the communications medium and supplied to user equipment 211 as indicated in FIG. 2. However, packets to be relayed to NIU 108 are placed in queue 206 for later transmission on a first-in-first-out basis, for example.

Queue 206 may also receive packets from user equipment 211. For example, with reference to FIG. 1, if it is desired to transmit packets from NIU 105 to NIU 108, such packets are conveyed to queue 206 from NIU 105 as shown. Queue 206 must therefore include some means for avoiding contention between packets arriving from user equipment 211 and packets arriving from receiver 205. This can be accomplished by alternately polling the two sources, for example, although many other techniques are well known in the art.

Packets from queue 206 are conveyed sequentially, during predetermined time slots, to fixed transmitter 207. In the case of an optical communications system, fixed transmitter 207 would be a laser, and would be optically coupled to the communications medium.

Packets which need to be transmitted from NIU 105 to NIU's from other subnetworks are transmitted via tunable transmitter 208. By way of example, assume a packet is to be transmitted from NIU 105 to NIU 110. As is shown in FIG. 1, such a packet must first be transmitted to NIU 107 on wavelength $\lambda 1$ for conveyance to NIU 110. Such packets are buffered in queue 210 as they arrive from the user equipment associated with NIU 105. Note that of the plurality of packets in queue 210 at any time, many of them may be destined for various subnetworks and thus must be transmitted at different wavelengths from other packets.

In operation, as a packet arrives to the front of queue 210, its address is read by tuning circuit 212. Tuning circuit 212, based upon a standard table lookup, will determine what wavelength the packet must be transmitted on by determining which subnetwork the destination NIU for the packet is associated with. Tuning circuit 212 will then cause tunable transmitter 208 to tune to the proper wavelength, while simultaneously causing tunable filter 201 to tune to the same wavelength.

The next idle time slot which exists on the particular subnetwork associated with the selected wavelength will then be detected by activity detector 203. Specifically, activity detector 203 will detect the absence of energy at the wavelength to which tunable filter 201 is tuned. When this occurs, activity detector 203 will enable tunable transmitter 208 and the packet will be transmitted onto communications medium 122. Combiner 209 serves to combine the signals from tunable transmitter 208 with those from fixed transmitter 207 and to couple the combination to communications medium 122.

Contention among NIU's competing for the same idle time slot on a given subnetwork must be resolved. With reference to FIG. 1, note, for example, that NIU's 102 and 103 are both disposed between NIU 101 and 104. Consider the case where both NIU's 102 and 103 simultaneously require transmission of a packet onto the subnetwork associated with λ1. There needs to exist some way of determining which of these two NIU's will utilize the next idle time slot which is transmitted from NIU 101. If this is done improperly, collisions may result, as described below.

Figure 3:
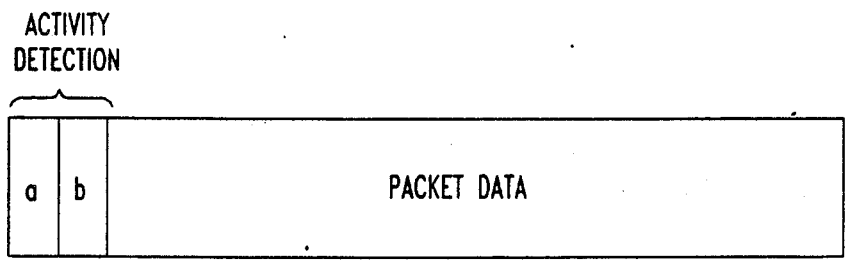
FIG. 3 depicts the structure of an exemplary packet which may be used in the invention.

FIG. 3 shows an exemplary packet format, with two bits reserved for activity detection. Assuming that the detection of activity requires one bit time, a reasonable assumption in today's high speed networks, at least two bits must be reserved in the packet to implement the system. Using the example from above with NIU's 102 and 103, it can be seen from FIG. 1 that NIU 102 will detect the empty time slot first, as communications flows clockwise. Next, NIU 102 will retune and utilize this time slot as previously described. However, by the time that happens, NIU 103 would receive the first bit of the idle time slot, detect the idle time slot, and thus transmit its data packet in the same time slot.

In order to avoid the above described problem, two bit times, as shown in FIG. 3, are reserved for activity detection. NIU 102 will assume a time slot is empty if the first bit, labelled a, of FIG. 3 is set to a logical "0". NIU 102 may then use that time slot to "change over" to the new subnetwork and transmit data from tunable transmitter 208 onto the new subnetwork. Further, NIU 102 would set the bit labelled b to a logical 1. As the packet propagates past NIU 103, NIU 103 would check the bit labelled "b" and, if set to a logical "0", NIU 103 would assume that the time slot is empty. By allowing two bits for activity detection, collisions are completely avoided.

The concept described extends in a straightforward manner to the case where more than two NIU's are disposed between any two NIU's on the same subnetwork. In general, if there exists NIU's 1 through N which are disposed in sequence between a pair of NIU's on the same subnetwork, then N bit times should be reserved in the packet header for activity detection. Each NIU uses a specified bit to detect that the time slot is idle, and each NIU, if it uses such an idle time slot, sets all of the remaining activity detection bits to a logical "1". In practice, if an optical fiber is used as the communications medium and passive couplers are used at each NIU, approximately 10 or 12 NIU's may be disposed between any two NIU's on the same subnetwork before the signal becomes attenuated beyond recognition.

While the above describes the basic operation of the invention, it is to be understood that other variations are possible without violating the scope or the spirit of the invention. For example, the architecture may be a bus rather than a ring type, or a tunable filter can be implemented using a tunable laser and a heterodyne receiver arrangement, and any communications media may be used instead of optical fiber.

Another variation involves eliminating the need to provide two sources of data from the user equipment. Specifically, referring to FIG. 2, it is shown that the exemplary user equipment must supply two separate data streams; one for the tunable transmitter, and one for the fixed transmitter. An alternative embodiment could allow the user equipment to supply only one data stream, and the NIU could separate the data for the tunable transmitter from the data for the fixed transmitter based upon the address in the packet of data.

Another variation includes a technique for providing protection against NIU's being "locked out" of a subnetwork. Specifically, and with reference to FIG. 1, it can be appreciatd that if NIU 101 is transmitting a long and continuous stream of data to NIU 104, then NIU 102 would be "locked out" of the λ1 subnetwork, since there will exist no idle time on that subnetwork for the duration of NIU 101's transmission. Accordingly, it may be desirable to reserve, for example, an out of band back channel, over which information would flow counterclockwise and allow NIU 102 to signal NIU 101 and thus cause NIU 101 to leave one or more time slots empty.

The network can also be duplicated on two or more communications media to provide substantially instant recovery from failures, as is well known in the art.

We claim:

1. A communications network comprising:
   a common communications medium;
   a plurality of network interface units (NIUs) coupled to said common communications medium, said NIUs being arranged into a plurality of subnetworks with each subnetwork including a predetermined sequence of NIUs;
   each particular NIU including
   means for determining if data to be transmitted by the particular NIU is destined for a receiving NIU on the subnetwork including the particular NIU or for a receiving NIU on a subnetwork other than the subnetwork including the particular NIU,
   means for transmitting data to a next NIU in the sequence of NIUs of the subnetwork including the particular NIU,
   tunable transmitter means for transmitting data to NIUs on subnetworks other than the subnetwork including the particular NIU, said tunable transmitter means being tuned to a particular subnetwork frequency in response to an address in the data to be transmitted and
   means for detecting if data is being transmitted by any other NIU on said common communications medium on the frequency to which said tunable transmitter means is tuned and for inhibiting said tunable transmitter means from transmitting data during intervals that data is detected as being transmitted on said frequency to which said tunable transmitter means is tuned.

2. A communications network as defined in claim 1 wherein said means for detecting includes tunable monitoring means for detecting time slots during which data is being transmitted on said communications medium on said frequency to which said tunable transmitter means is tuned and wherein said intervals are time slots.

3. A communications network as defined in claim 2 wherein each particular NIU further includes means for receiving data on a frequency assigned to the subnetwork including the particular NIU.

4. A communications network as defined in claim 3 wherein said means for transmitting data to a next NIU transmits at a frequency assigned to the subnetwork including the particular NIU.

5. A communication network as defined in claim 4 wherein said medium comprises an optical communications medium and each NIU further includes an optical coupler for interfacing to said medium.

* * * * *